United States Patent [19]

Aharony et al.

[11] Patent Number: 4,621,418
[45] Date of Patent: Nov. 11, 1986

[54] COIL WINDING APPARATUS

[76] Inventors: Shaul Aharony, Jabotinsky 9, Kiryat Ono; Sammi Aharony, Lev Yafe 74, Herzlia, both of Israel

[21] Appl. No.: 607,528

[22] Filed: May 7, 1984

[51] Int. Cl.[4] .................. H02K 15/04; H02K 15/10
[52] U.S. Cl. ........................................... 29/736; 29/241; 29/605; 140/92.2; 242/7.13
[58] Field of Search ............... 242/7.08, 7.09, 7.13, 242/7.14, 7.15; 29/736, 605, 596, 241; 140/92.1, 92.2; 156/521

[56] References Cited

U.S. PATENT DOCUMENTS

| 3,031,736 | 5/1962 | Madden | 29/605 |
| 3,166,104 | 1/1965 | Foley et al. | 140/92.2 |
| 3,649,415 | 3/1972 | Eminger | 156/521 |
| 3,659,795 | 5/1972 | Bachi et al. | 242/7.08 |

Primary Examiner—Billy S. Taylor
Attorney, Agent, or Firm—Browdy and Neimark

[57] ABSTRACT

A coil winding machine comprising a spindle adapted to be driven in rotational motion and to have one or more coil wound thereupon, wire supply apparatus for supplying wire to the spindle for producing the wound coil, insulative sleeve release apparatus for selectably retaining and releasing insulative sleeves through which the wire is drawn to form the coil, such that the sleeves are properly positioned on the wound coils and control apparatus for governing the operation of the spindle and of the release apparatus whereby release of the insulative sleeve takes place at the correct time for proper positioning of the sleeve on the coil.

4 Claims, 11 Drawing Figures

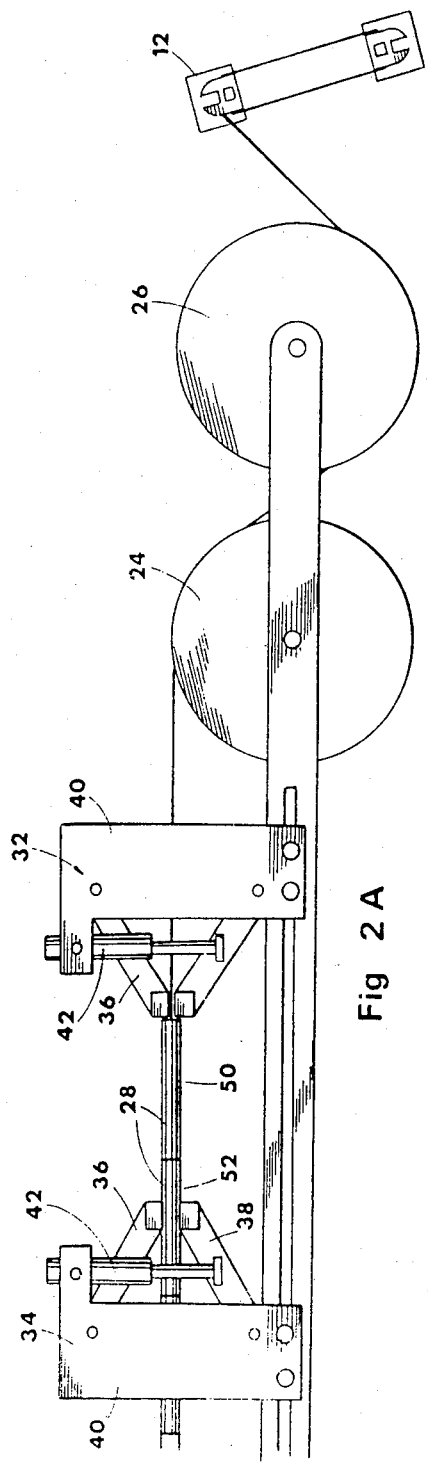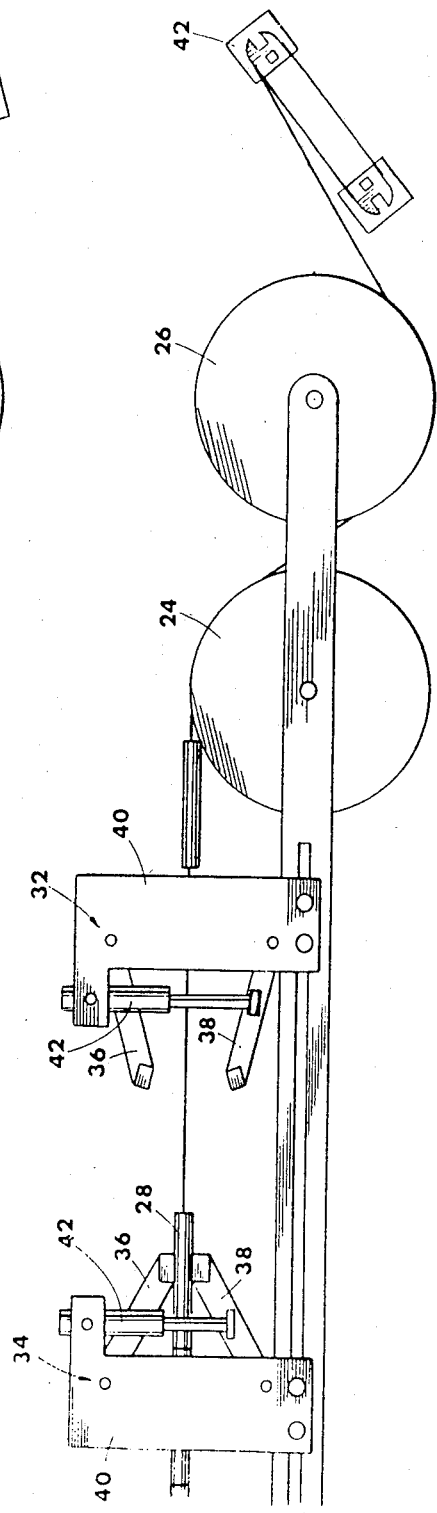

COIL WINDING APPARATUS

FIELD OF THE INVENTION

The present invention relates to coil winding apparatus and more particularly to coil winding apparatus for producing electric motor winding coils.

BACKGROUND OF THE INVENTION

Semi-automatic machinery for winding coils useful for electric motor windings are known in the marketplace. A particularly successful machine of this type is presently manufactured and marketed by the Applicants under the trade name SAMATIC and is operative for winding coils of selectable size and number of turns.

There exist a number of limitations and difficulties with conventional coil winding machines of the type described above. It is necessary to precisely position insulative sleeves on the coiled wire at a predetermined position with respect to the coil. Conventionally, this positioning is done by hand by an operator who holds the insulative sleeves in his hand. The wire is drawn through the sleeves as the coil is wound. The operator releases the sleeve after the winding of the coil is completed and then he manually positions it at the required position with respect to the coil.

It may be readily understood that the operation of such a machine requires an operator for each machine in operation and involves very high labor costs.

Another difficulty in using conventional coil winding machinery is the need to remove the wound coil from the spool onto which it is wound while maintaining its integrity. Normally, using conventional machines, the individual wires are bunched together as the coil is removed from the spindle, thus rendering their placement on the motor difficult and time consuming.

SUMMARY OF THE INVENTION

The present invention seeks to provide an automatic coil winding machine which incorporates solutions to the problems described above which are encountered in the use of conventional coil winding machinery.

There is thus provided in accordance with a preferred embodiment of the present invention, a coil winding machine comprising a spindle adapted to be driven in rotational motion and to have one or more coil wound thereupon, wire supply apparatus for supplying wire to the spindle for producing the wound coil, insulative sleeve release apparatus for selectably retaining and releasing insulative sleeves through which the wire is drawn to form the coil, such that the sleeves are properly positioned on the wound coils and control apparatus for governing the operation of the spindle and of the release apparatus whereby release of the insulative sleeve takes place at the correct time for proper positioning of the sleeve on the coil.

Further in accordance with a preferred embodiment of the invention, the retaining apparatus comprises apparatus for selectably preventing passage of the forwardmost insulating sleeve in a row of retaining sleeves through which the wire passes. Additionally in accordance with a preferred embodiment of the present invention, the retaining apparatus also comprises apparatus for engaging the next to forwardmost insulating sleeve at all times when the apparatus for preventing passage is in its disengaged position, whereby passage is permitted.

Further in accordance with a preferred embodiment of the present invention, the spindle comprises first and second selectably separable coil formers, each defining at least one coil winding location and a recess extending along at least one of the spindle elements for accomodating strip adhesive material, whereby the coil is wound over the strip of adhesive material and in engagement therewith, such that the adhesive material retains the form of the coil even when it is removed from the spindle elements.

Additionally in accordance with a preferred embodiment of the present invention, there is provided a technique for producing wound coils suitable for motor windings comprising the steps of providing a rotatable coil former defining at least one coil winding location, extending adhesive strip material in engagement with the spindle so as to engage coils wound thereon, winding the coil onto the spindle, causing adhesive strip material to substantially surround and engage the coil while it is still mounted on the spindle to retain the orientation of the wires therein and removing the wound coil, thus surrounded, from the spindle.

Additionally in accordance with an embodiment of the present invention, there is provided a wound coil suitable for use in a motor winding comprising a coil of wire defining a plurality of layers of wound wire and adhesive web material extending transversely to the coil and surrounding it, thereby maintaining the orientation of the layers of wound wire generally as oriented on the spindle.

BRIEF DESCRIPTION OF THE DRAWING

The present invention will be understood and appreciated more fully from the following detailed description taken in conjunction with the drawings in which:

FIGS. 2A, 2B and 2C are pictorial illustrations of the operation of the insulating sleeve release apparatus forming part of the apparatus of FIG. 1 in three different stages of operation;

DETAILED DESCRIPTION OF THE INVENTION

Figure 1:
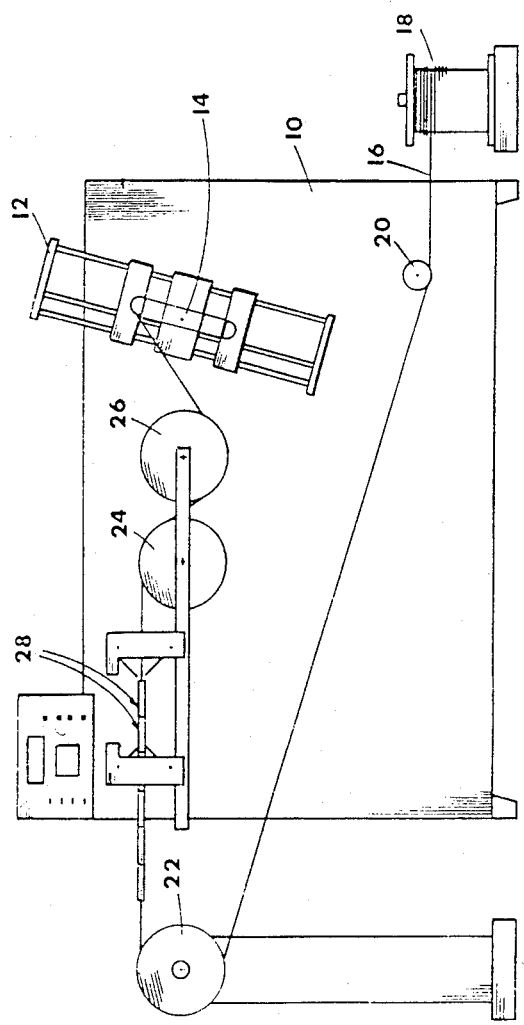
FIG. 1 is a pictorial illustration of a coil winding machine constructed and operative in accordance with a preferred embodiment of the present invention.

Reference is now made to FIG. 1, which illustrates automatic coil winding apparatus constructed and operative in accordance with a preferred embodiment of the present invention. The apparatus comprises a base 10, onto which is mounted a spindle 12, which is arranged for driven rotation relative to base 10 about a rotation axis 14.

Coiling winding wire 16, such as lacquered wire suitable for use in electric motor coil windings, is supplied from a reel 18 or other suitable supply source, and via typically at least two pulleys 20 and 22, and a pair of co-operative positioning pulley 24 and 26 to spindle 12, for being wound thereon to define one or more wound coils.

A plurality of insulative sleeves 28 are threaded on wire 16 and are retained and selectably released by an insulative sleeve release mechanism 30, the operation of which will be described hereinafter in detail. The provision of an automatic insulative sleeve release mechanism 30 is a primary feature of the present invention.

It is normally desired that an insulative sleeve be positioned on the end of the coil surrounding the last turn thereof. This desired positioning is effected by insulative sleeve release mechanism 30, whose structure and operation is illustrated in FIGS. 2A-2C.

Figure 2C:
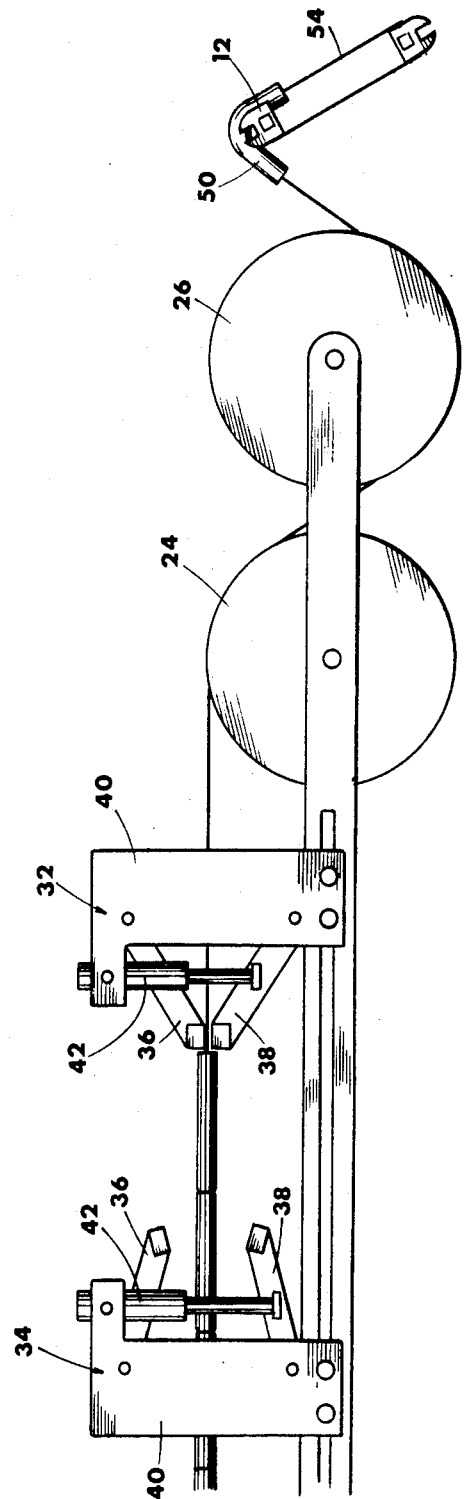

As seen in FIGS. 2A-2C the insulative sleeve release mechanism 30 comprises forward and rearward sleeve retaining assemblies 32 and 34. The sleeve retaining assemblies 32 and 34 may be of generally similar construction, taking into account that the forward assembly 32 is arranged such that in its closed orientation, it defines a barrier forward of the forwardmost insulative sleeve, while the rearward assembly 34, in its closed orientation, engages the second to forwardmost sleeve, preventing release thereof.

Generally speaking, both of assemblies 32 and 34 comprise respective top and bottom finger portions 36 and 38 which are pivotably mounted onto a base 40. A solenoid 42 or other suitable extensible element is operative to selectably position the bottom finger portion 38 in either a closed or open orientation as desired. The top and bottom finger portions are joined together by a conventional linkage, not shown, whereby when the bottom finger portion 38 is moved to an open orientation, the top finger portion is also moved to an open orientation and similarly for a closed orientation. Alternatively the designation of the top and bottom finger positions can be reversed.

The operation of the insulative sleeve release mechanism 30 is based on the appreciation that if unrestrained, the insulative sleeves 28 will tend to run along with the wire with negligible slippage. As noted above, it is desired to achieve precise positioning of the insulative sleeve on the wound coil.

FIG. 2A shows the orientation of release mechanism 30 prior to release. It is seen that both assemblies 32 and 34 are in their closed orientation, assembly 32 blocking passage of the forwardmost insulative sleeve 50 and assembly 34 engaging the second to forwardmost sleeve 52.

Since it is desired that only one sleeve be released at a given time, at the appropriate time for release, assembly 32 assumes an open orientation, as seen in FIG. 2B, while assembly 34 remains in its closed orientation. A short predetermined time after release, sufficient to allow passage of sleeve 50, assembly 32 again assumes its closed orientation and assembly 34 is opened to allow the remaining sleeves 28 to move foward against the barrier defined by assembly 32. FIG. 2C illustrates this intermediate orientation and shows the desired positioning of an insulative sleeve, here sleeve 50 on the coil 54 defined on spindle 12. A sufficient time after opening of assembly 34, it is again closed to prepare for another release. It is appreciated that assembly 34 may be closed at the time that sleeve 50 is actually wound onto coil 54.

It is appreciated that the length of the sleeve may vary from motor to motor. Thus it may be understood that the separation between the assemblies 32 and 34 must be adjustable so that it can be maintained greater than the length of the sleeve but less than twice its length.

Figure 6:
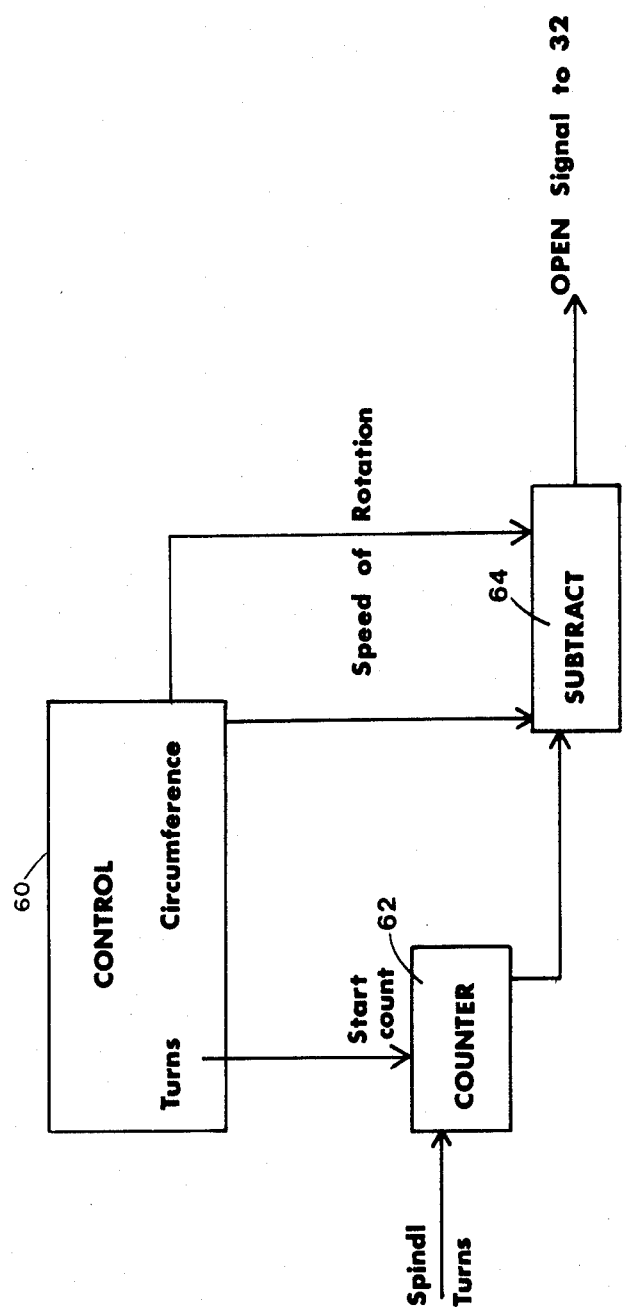
FIG. 6 is a block diagram illustration of the control circuitry governing operation of the sleeve release apparatus.

Reference is now made to FIG. 6 which is an electrical block diagram illustration of control apparatus for governing the operation of the release mechanism 30. The control mechanism comprises a control panel 60 in which the operator enters the number of turns per coil and the coil circumference. The entry devices are typicallty wheel type switches of conventional construction and may be any other suitable type of entry devices.

The information as to the number of turns per coil is supplied to a count down counter which counts down from the indicated number of turns in accordance with the number of rotations of the spindle 12. At a predetermined number of turns before completion of the coil, typically three turns, the counter output activates a subtraction circuit 64 which determines the precise time when an OPEN order is to be given to assembly 32 in order for the insulative sleeve to reach the coil 54 at the precise desired position illustrated in FIG. 2C.

The subtraction carried out by circuit 64 is according to the following expression:

Time to OPEN=(turns remaining)/(speed of rotation of spindle in units of revolutions/time)—(wire length from release location to desired position on coil)/(winding speed in units of length/time)

It is appreciated that it is necessary for assembly 32 to have returned to its closed orientation prior to expected receipt of the OPEN signal supplied from subtraction circuit 64.

Reference is now made to FIGS. 3A-3D and 4, which illustrate another feature of the present invention related to the spindle 12. As in prior art apparatus of this type, the spindle 12 comprises first and second coil formers 70 and 72 which are mounted on respective support elements 74 and 76 which are selectably separated from each other along an axis so as to define coils of varying circumferences. It is appreciated that the configurations of 70 and 72 may vary and these elements may be interchanged so as to define coils of any suitable desired configuration.

Each of coil formers 70 and 72 include a plurality of upstanding elements 80 which define coil winding locations 82 onto which coils of wire are wound. According to a preferred embodiment of the present invention, a transverse recess 84 is defined underlying all of the coil winding locations 82 and arranged to accomodate a strip of adhesive material 86, such as masking tape. Recess 84 may conveniently communicate with a reservoir of such adhesive material (not shown).

Figure 3A:
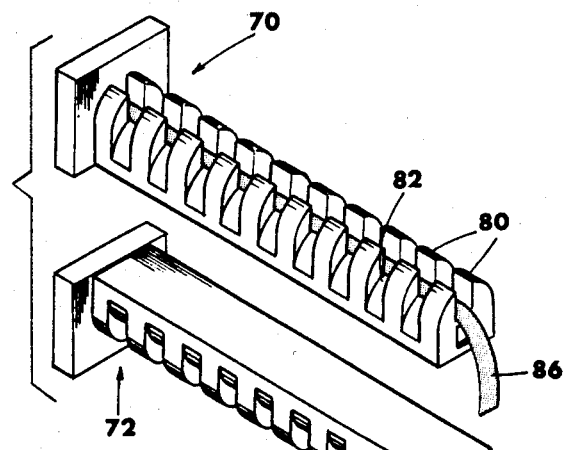
FIGS. 3A, 3B, 3C and 3D are pictorial illustrations of the spindle apparatus forming part of the apparatus of FIG. 1 in four different stages of operation.
Figure 3B:
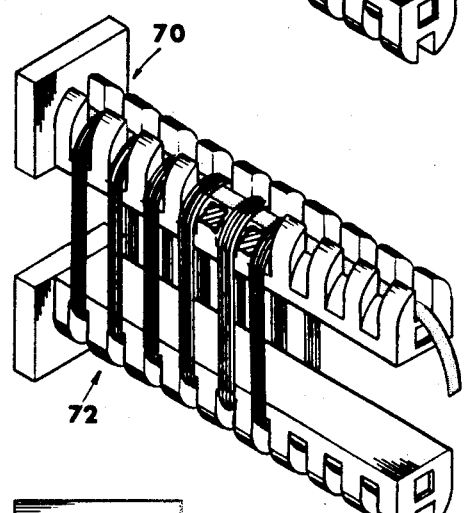
Figure 4:
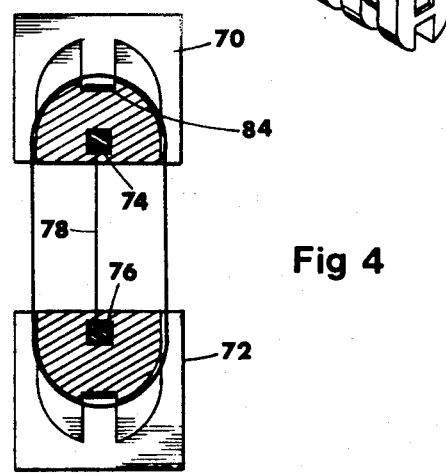
FIG. 4 is a sectional view of the spindle apparatus corresponding to FIG. 3B.
Figure 3C:
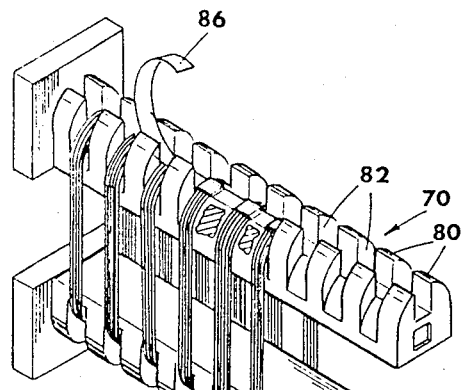

According to a preferred embodiment of the present invention, the adhesive tape 86 is arranged along recess 84 with its adhesive side facing up, as illustrated in FIG. 3A. The coils are then wound thereon, as shown in FIG. 3B. Then a continuation of the strip of tape 86 is extended back over the coils in adhesive engagement therewith, as shown in FIG. 3C.

Figure 3D:
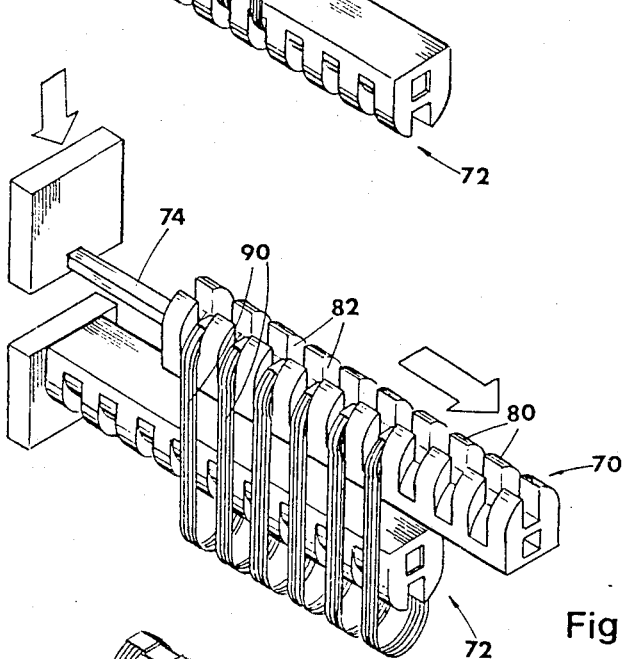
Figure 5:
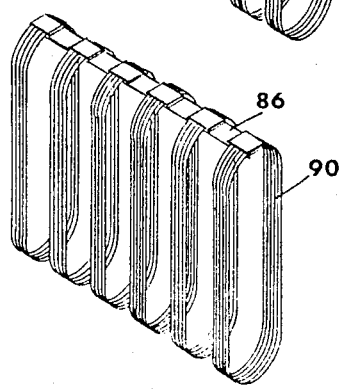
FIG. 5 is a pictorial illustration of a series of completed wound coils produced in accordance with the present invention.

After all of the coils have been engaged on both sides by the adhesive tape, the two coil formers 70 and 72 of the spindle are moved together along axis 78 so as to free the coils 90, as illustrated in FIG. 3D. The coils are removed as a unit, illustrated in FIG. 5. Coils presented in the form illustrated in FIG. 5 have a number of important advantages: They are easily and quickly removed from the spindle. They retain their flat configuration and do not tend to become bunched and thus are easily inserted into slots on the electric motor. Just prior to installation, the individual coils can be separated from each other as needed.

It will be appreciated by persons skilled in the art that the present invention is not limited by what has been particularly shown and described hereinabove. Rather the scope of the present invention is defined only by the claims which follow:

We claim:

1. A coil winding machine comprising:
   a spindle adapted to be driven in rotational motion and to have one or more coils wound thereupon;
   wire supply means for supplying wire to said spindle for producing the wound coil;
   insulative sleeve release means for selectably retaining and releasing insulative sleeves through which the wire is drawn to form the coil, such that the sleeves are properly positioned on the wound coils, said release means comprising means for selectably preventing passage of the forwardmost insulating sleeve in a row of retaining sleeves through which the wire passes and having engaged and disengaged positions; and
   control means for governing the operation of the spindle and of the release means whereby release of the insulative sleeve takes place at the correct time for proper positioning of the sleeve on the coil.

2. A coil winding machine according to claim 1 and wherein said retaining means also comprises means for engaging the next to forwardmost insulating sleeve at all times when the apparatus for preventing passage is in its disengaged position, whereby passage of the forwardmost insulative sleeve is permitted.

3. A coil winding machine according to claim 1 and wherein said spindle comprises first and second selectably separable coil formers, each defining at least one coil winding location and a recess extending along at least one of the spindle elements for accomodating strip adhesive material, whereby the coil is wound over the strip of adhesive material and in engagement therewith, such that the adhesive material retains the form of the coil even when it is removed from the coil formers.

4. A coil winding machine according to claim 1 and wherein said control means comprise:
   a count down counter operative to receive information as to the desired number of turns of the coil and to count down therefrom to a predetermined number of remaining turns;
   subtraction means operative to receive the output of the count down counter and to subtract therefrom a quantity corresponding to the number of turns required for the insulative sleeve to reach the coil from its point of release.

* * * * *